United States Patent [19]

Hale

[11] 3,777,831
[45] Dec. 11, 1973

[54] DIRIGIBLE SYSTEM FOR SNOWMOBILES

[76] Inventor: Dean H. Hale, 2500 N. Main, Logan, Utah 84321

[22] Filed: Apr. 3, 1972

[21] Appl. No.: 240,596

[52] U.S. Cl................. 180/5 R, 280/21 A, 280/25
[51] Int. Cl............................................ B62m 27/02
[58] Field of Search....................... 180/5 R, 5 A, 3, 180/4, 6; 280/21 A, 21 R, 96.1, 16

[56] References Cited
UNITED STATES PATENTS

| | | | |
|---|---|---|---|
| 3,734,219 | 5/1973 | Christensen.......................... | 180/5 R |
| 3,550,706 | 12/1970 | Watkins.............................. | 180/5 R |
| 3,650,341 | 3/1972 | Asmussen........................... | 180/5 R |
| 3,675,939 | 7/1972 | Vik..................................... | 180/5 R |
| 3,623,564 | 11/1971 | Higginbotham..................... | 180/5 R |

*Primary Examiner*—Richard J. Johnson
*Attorney*—Lynn G. Foster

[57] ABSTRACT

A snowmobile comprising a body for supporting a driver, a pair of skis mounted in parallel relation to support at least a portion of said body, steering mechanism connected to said skis and operable to displace said skis in a manner to provide directional control for said snowmobile, and means actuated by said steering mechanism for displacing said body to shift the weight of the driver toward the direction of a desired turn. Method and several forms of apparatus are disclosed.

3 Claims, 9 Drawing Figures

PATENTED DEC 11 1973

DIRIGIBLE SYSTEM FOR SNOWMOBILES

BACKGROUND

1. Field of Invention

This invention relates to snowmobiles and is particularly directed to improved steering mechanism for snowmobiles and the like.

It is well known that when a moving snowmobile attempts to make a turn, inertia and centrifugal force tend to cause the body of the snowmobile to lean away from the direction of the turn. The magnitude of these forces is directly related to the mass of the snowmobile, its velocity and the sharpness of the turn. Where these forces are excessive, they may cause the snomobile to roll over, resulting in damage to the snowmobile and possibly fatal injuries to the driver and passengers.

2. Prior Art

In relatively sophisticated and expensive vehicles, such as automobiles and trains, these forces are counteracted, to some extent, by means of sway bars, shock absorbers, suspension systems and the like. In simpler vehicles, such as snowmobiles, these forces are counteracted simply by the driver shifting his weight toward the direction of the desired turn to balance the tendency of the vehicle to roll over. Unfortunately, these forces act upon the driver, as well as the snowmobile, with the result that the greater the need for the driver to shift his weight into the turn, the more difficult it becomes to do so. Consequently, considerable strength and agility are required to successfully control such snowmobiles. Furthermore, in order to make sharp turns, even at moderate speeds, it may be necessary for the driver to shift his weight completely to one side of the snowmobile, so that he is simply hanging on to the side of the snowmobile and extending outward as far as possible. Obviously, when this is done, the driver is in danger of falling off of the snowmobile or being struck by passing rocks, trees, other snowmobiles and the like. Despite these risks, the driver's ability to control the snowmobile is directly related to his ability and willingness to perform such feats.

To overcome these problems, snowmobiles are designed with the center of gravity as low as possible and with the skis, or other ground engaging means, spaced apart as far as possible so as to minimize the likelihood of rolling over. Moreover, as indicated above, sway bars, suspension systems and the like are sometimes provided to resist such forces. Nevertheless, none of the prior art techniques have been entirely satisfactory in overcoming the problem.

BRIEF SUMMARY AND OBJECTS OF INVENTION

These disadvantages of the prior art are overcome with the present invention and means are provided for effectively overcoming the forces tending to roll the vehicle over, even during sharp turns at relatively high speeds, while allowing the driver to remain seated on or in the vehicle.

The advantages of the present invention are preferably attained by providing means actuated by the steering mechanism for tilting the body of the vehicle toward the direction of a desired turn.

Accordingly, it is an object of the present invention to provide means for improving the directional control of vehicles.

Another object of the present invention is to improve the safety of vehicles.

A further object of the present invention is to provide means for reducing the possibility of rolling a vehicle over during a turn.

Another object of the present invention is to provide means whereby vehicles, such as snowmobiles, can be steered without requiring the driver to shift his weight to balance the forces tending to roll the vehicle over.

A specific object of the present invention is to provide a vehicle comprising: a body for supporting a driver, ground engaging means supporting at least a portion of said body, steering mechanism connected to said ground engaging means and operable to displace said ground engaging means in a manner to provide directional control for said vehicle, and means actuated by said steering mechanism for displacing said body to shift the weight of the driver toward the direction of a desired turn.

These and other objects and features of the present invention will be apparent from the following detailed description, taken with reference to the accompanying drawings.

DETAILED DESCRIPTION OF ILLUSTRATED EMBODIMENT

Figure 1:
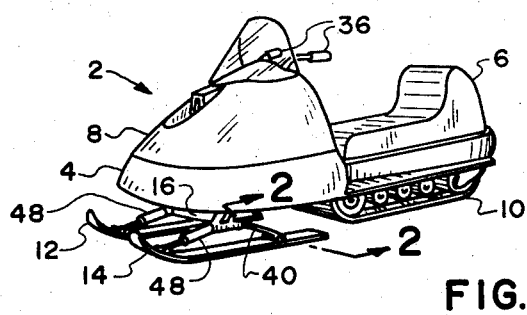
FIG. 1 is an isometric view of a snowmobile embodying the present invention.
Figure 2:
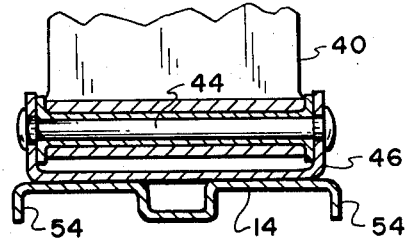
FIG. 2 is a transverse section through one of the skis of the snowmobile of FIG. 1, taken on the line 2—2 thereof.
Figure 3:
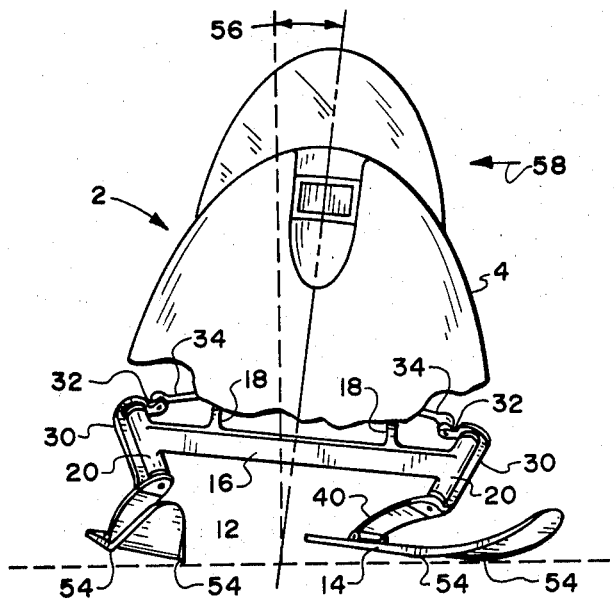
FIG. 3 is a front elevation of the snowmobile of FIG. 1 with the skis displaced to make a left turn illustrated with the shock absorbers omitted.
Figure 4:
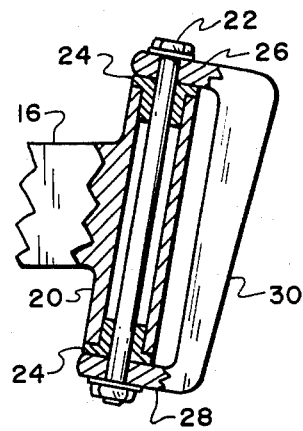
FIG. 4 is an enlarged view of one of the king pins of the snowmobile of FIG. 1, with parts broken away and in section for clarity.
Figure 5:
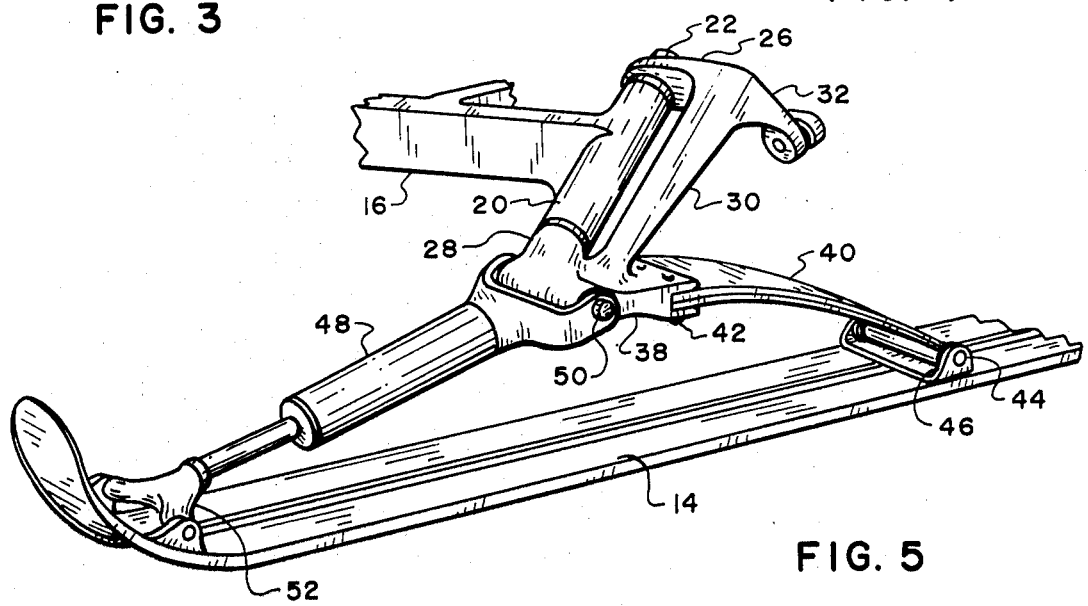
FIG. 5 is an enlarged isometric view of the ski mounting mechanism of the snowmobile of FIG. 1.

In that form of the present invention chosen for purposes of illustration in FIGS. 1-5, a snowmobile, indicated generally at 2, has a body 4, including a seat 6 and a motor housing 8, supported by a drive track 10 and a pair of skis 12 and 14. As best seen in FIGS. 1, 3 and 5, the body 4 is mounted on the skis 12 and 14 by means of a crossbar 16 which is mounted transversely beneath the body 4, as by braces 18. A pair of generally cylindrical king pin housings 20 are provided at opposite ends of the crossbar 16 and are disposed at relatively extreme caster and camber, as seen in FIGS. 3, 4 and 5. A king pin 22 is journaled in each of the king pin housings 20 by suitable bearings 24 and extends through upper and lower flanges 26 and 28, respectively, of a steering bracket 30 to pivotally secure the steering bracket 30 to the crossbar 16. At its upper end, the steering bracket 30 is formed with a generally L-shaped steering arm 32 which is pivotally coupled, by link 34, to the conventional steering mechanism, not shown, within the housing 8, which is actuated by handle bars 36 or the like. At its lower end, the steering bracket 30 is formed with an attaching portion 38 having forward and rear bores, not shown, extending transversely therethrough. An arcuate leaf spring 40 has one end pivotally secured to the rear bore of the attaching portion 38, as by pins 42, while the opposite end of the spring 40 is pivotally secured by pin 44 to a generally U-shaped bracket 46 on the upper side of the adjacent ski 12 or 14. To stabilize the front ends of the skis 12 and 14, a stabilizing device, such as shock absorber 48, may be provided having one end pivotally secured to the front bore of the attaching portion 38, as by pin 50, while the other end of the stabilizing device is pivotally secured, as seen at 52, adjacent the front end of the adjacent ski 12 or 14. As best seen in FIGS. 2 and 3, the skis 12 and 14 are preferably formed with edge blades 54 projecting downward from the opposite edges of the skis 12 and 14 and extending substantially the entire length thereof.

In use, the snowmobile 2 is operated in a conventional manner. However, as seen in FIG. 3, in making turns, the extreme caster and camber of the dirigible system of the present invention acts to displace the ski 12 on the outside of the turn outward and downward from the body 4 of the snowmobile 2, while the inside ski 14 is raised toward the body 4, serving to tilt the body 4 toward the direction of the desired turn, as indicated by arrow 56. This shifts the weight of the body 4 and a driver on the seat 6 toward the direction of the desired turn, in opposition to centrifugal force and inertia, represented by arrow 58, tending to cause the snowmobile 2 to roll over. This greatly improves the stability of the snowmobile 2 in turns and, thus, improves the maneuverability of the snowmobile 2. At the same time, since the shift in weight is accomplished by the snowmobile 2, rather than by movement of the driver, the driver may remain seated on the seat 6. This greatly increases the safety of snowmobiling. In addition, the caster of the dirigible system of the present invention serves to tilt the skis 12 and 14 toward the direction of the turn, as seen in FIG. 3. This causes the blades 54 on the sides of skis 12 and 14 inside the turn to dig into the snow, which further improves the stability of the snowmobile 2 in turning.

Figure 6:
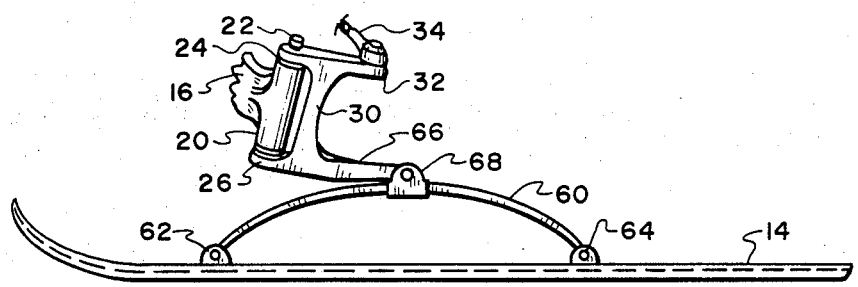
FIG. 6 is a side view of the ski mounting mechanism of an alternative form of the apparatus of FIG. 1.

FIG. 6 illustrates an alternative device for securing the skis 12 and 14 to the dirigible system of FIG. 1. In this form, a full leaf spring 60 is pivotally secured to the ski 14 at points 62 and 64 spaced along the length of the ski 14. The steering bracket 30 has a rearward projection 66 formed on its lower end and a suitable clamp 68 is employed to secure the end of the projection 66 to approximately the midpoint of the spring 60.

In use, this form of the invention functions substantially identically to that of FIGS. 1–5. However, this form has the advantage that it allows the skis 12 and 14 to project a lesser distance beyond the front of the body 4 or, if desired, to be mounted completely beneath the body 4. This provides an additional safety feature in that it allows the body 4 to encounter, and possibly deflect, obstacles, such as trees or rocks, which might be trapped between projecting skis.

Figure 7:
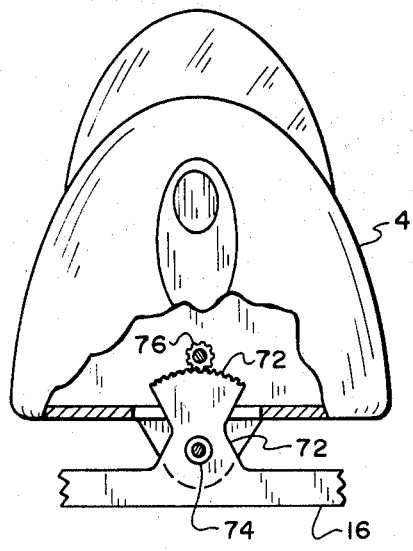
FIG. 7 is a partial front elevation, with parts broken away, showing an alternative form of the apparatus of FIG. 1.

FIG. 7 illustrates a further alternative form of the present invention. In this form of the invention, the crossbar 16 is formed with an upwardly projecting central portion 70 having an arcuate, toothed upper surface 72. The body 4 is pivotally secured to the crossbar 16, as seen at 74, and is similarly pivoted adjacent the rear end of the running gear, so that the body 4 is free to pivot about its longitudinal axis. A pinion gear 76 is carried by the body 4, in engagement with the arcuate, toothed surface 72, and is rotatable by the steering mechanism, not shown. Thus, as the steering mechanism is actuated, the pinion gear 76 is rotated and rides along the arcuate surface 72 to tilt the body 4 in the direction of the turn.

Figure 8:
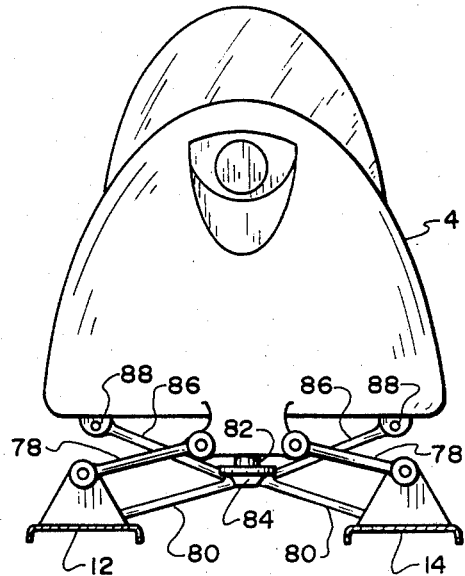
FIG. 8 is a front elevation, with parts broken away, of an additional alternative form of the apparatus of FIG. 1.
Figure 9:
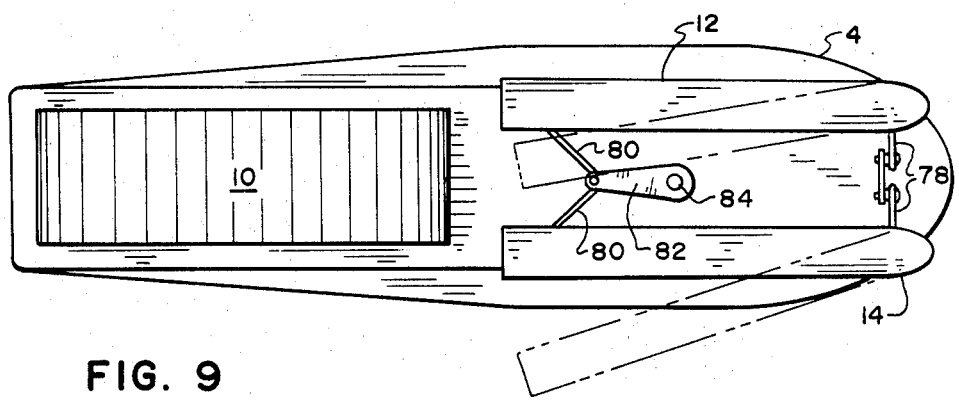
FIG. 9 is a bottom plan view of the snowmobile of FIG. 8.

FIGS. 8 and 9 illustrate a further alternative form of the dirigible system of the present invention. In this form of the invention, the front ends of the skis 12 and 14 are pivotally secured to the body 4 by links 78, while the rear ends of the skis 12 and 14 are pivotally connected by toggle links 80 to a steering arm 82 mounted on the end of a shaft 84 which is rotatable by the conventional steering mechanism, not shown. A second pair of toggle links 86 each have one end pivotally coupled to the steering arm 82 and have the other end pivotally coupled to the body 4, as seen at 88, and extend substantially in line with the toggle links 80.

In use, when the steering mechanism is turned, it rotates shaft 84 and steering arm 82, causing the toggle links 80 to displace the rear ends of the skis 12 and 14, as seen in broken lines in FIG. 9. At the same time, the toggle links 86 act to force the ski 14, on the outside of the turn, downward away from the body 4 and to draw the ski 12, on the inside of the turn, upward toward the body 4. This serves to tilt the body 4 toward the direction of the turn.

It will be apparent that the dirigible system of the present invention may be employed with vehicles other than snow obiles. In addition, numerous other variations and modifications may be made without departing from the present invention. Accordingly, it should be clearly understood that the forms of the present invention described above and shown in the accompanying drawings are illustrative only and are not intended to limit the scope of the present invention.

What is claimed is:

1. A snowmobile comprising:
 a body;
 a transverse beam connected to the forward under side of the body, said beam terminating at each end in journal means;
 each journal means comprising a sleeve extending upwardly and outwardly;
 bracket means rotatably joined to each sleeve means and also extending upwardly and outwardly;
 a pair of skiis disposed generally beneath the respective bracket means;
 suspension means spanning between each ski and the adjacent bracket means;
 steering means to turn the snowmobile, said steering means comprising linkage joined to each bracket means oppositely rotating the respective bracket means during a turn causing (a) the outside ski to move down and out from the snowmobile, (b) the inside ski to move up and in toward the snowmobile and (c) tilting the body inwardly thereby shifting the weight of the driver and the weight of the snowmobile in the direction of the turn.

2. The snowmobile of claim 1 wherein each suspension means comprise leaf spring means.

3. A snowmobile steering system comprising:

a transverse beam adapted to be connected to the forward under side of a frame of a snowmobile, said beam terminating at each end in journal means;

each journal means comprising a sleeve extending upwardly and outwardly;

bracket means rotatably joined to each sleeve and also extending upwardly and outwardly;

suspension means connected to each bracket means and adapted to be respectively connected to a ski;

linkage means adapted to be connected to steering means of the snowmobile and also connected respectively to each bracket means oppositely rotating the respective bracket means during a turn causing (a) the outside ski to move down and out from the snowmobile, (b) the inside ski to move up and in toward the snowmobile and (c) tilting of the snowmobile thereby shifting the weight of the driver and the snowmobile in the direction of the turn.

* * * * *